US006539974B2

United States Patent
Steinrück et al.

(10) Patent No.: US 6,539,974 B2
(45) Date of Patent: Apr. 1, 2003

(54) VALVE WITH GUIDE EXTENSIONS FOR VALVE PLATE

(75) Inventors: Peter Steinrück, Hallstatt (AT); Dietmar Artner, Oberwart (AT)

(73) Assignee: Hoerbiger Kompressortechnik Services GmbH, Vienna (AT)

( * ) Notice: Subject to any disclaimer, the term of this patent is extended or adjusted under 35 U.S.C. 154(b) by 0 days.

(21) Appl. No.: 09/835,813

(22) Filed: Apr. 17, 2001

(65) Prior Publication Data

US 2002/0002997 A1 Jan. 10, 2002

(30) Foreign Application Priority Data

Apr. 18, 2000 (AT) .............................. 686/2000

(51) Int. Cl.$^7$ ............................................. F16K 15/10
(52) U.S. Cl. ........................ 137/516.23; 137/516.15; 137/512.1
(58) Field of Search ............... 137/516.11, 516.13, 137/516.23, 512.1, 512, 516.15, 516.21

(56) References Cited

U.S. PATENT DOCUMENTS

| 1,244,286 A | | 10/1917 | Breinl | |
|---|---|---|---|---|
| 2,222,550 A | | 11/1940 | Wintzer | |
| 3,829,253 A | | 8/1974 | Bunn et al. | |
| 3,875,962 A | * | 4/1975 | Bauer et al. | ............ 137/516.21 |
| 4,307,751 A | * | 12/1981 | Mayer et al. | ........ 137/516.13 X |
| 4,924,906 A | * | 5/1990 | Hrabal | .................... 137/512.1 |
| 5,678,603 A | * | 10/1997 | Tschop | ..................... 137/512.1 |

FOREIGN PATENT DOCUMENTS

| AT | 391928 | 12/1990 |
|---|---|---|
| DE | 338942 | 1/1920 |
| EP | 0345245 | 12/1989 |
| GB | 6450 | 4/1914 |
| GB | 128018 | 6/1919 |

* cited by examiner

*Primary Examiner*—Kevin Lee
(74) *Attorney, Agent, or Firm*—Dykema Gossett PLLC

(57) ABSTRACT

The valve includes a valve seat (1) having passage channels (2) for the controlled medium which are arranged essentially in a ring-shape and concentrically, of a catcher (3) having flow-off channels (4), a valve plate (5) that is movably arranged, in particular it is movable back and forth, between the catcher (3) and the valve seat (1), having several individual ring plates (7) that are allocated to the passage channels of the valve seat (1), and a support plate (8) that is spring-loaded by the catcher (3) and rests on the ring plates (7). To allow for the guiding of each single ring plate (7) in the direction of lift with simple, joint springs, the support plate (8) includes individual, concentrically arranged support rings (9, 9') that overlap respectively two ring plates (7), which are guided on the guiding extensions (10) of the catcher (3) in the direction of lift, and the guiding extensions (10) are arranged on the radial cross-pieces (11) of the catcher (3), respectively in the areas of the outer and inner circumferences of the support rings (9, 9'), and protrude in the direction of the valve seat (1) to such an extent that the respectively adjacent ring plate (7) is also guided on it across the entire lift.

11 Claims, 5 Drawing Sheets

9,9'

9'

VALVE WITH GUIDE EXTENSIONS FOR VALVE PLATE

BACKGROUND OF THE INVENTION

1. Field of the Invention

The invention relates to a valve, in particular to a valve for piston compressors, which includes a valve seat having passage channels that are essentially arranged concentrically and in the shape of a ring for the medium that is being routed; a catcher which has flow-off channels and is arranged at a distance above the valve seat; and a valve plate which is movably arranged between the catcher and the valve seat, in particular it is movable back and forth, and includes several individual ring plates which are cooperable with the passage channels of the valve seat with essentially sloped sealing surfaces, as well as a support plate which is spring-loaded from the catcher side and rests on the ring plates.

2. The Prior Art

To improve the efficiency of piston compressors, valves with sealing elements which are equipped with sealing surfaces that are sloped or torically shaped have become known in the art. Consequently, the flow that occurs through the valves forms only minor turbulence, causing therefore only minor losses of pressure. To achieve safe sealing action the sealing elements must be able to place themselves snugly against the geometry of the sealing surfaces that are in the valve seat. In the usual realizations of the sealing gap as a concentric, conical surface, this is accomplished by using sealing elements that are formed as unconnected rings.

A realization with individually spring-equipped ring plates, which is known in the art from, e.g., U.S. Pat. No. 3,536,094, has the disadvantage that significant limitations must be dealt with when choosing the locking spring. On the one hand, the springs are placed into the knot that is formed by a net consisting of cross-pieces running in a radial and in a circumferential direction of the valve catcher. This reduces the number of springs that act upon the valve ring considerably and, simultaneously, the diameter of the springs may not essentially exceed the width of the rings, if unfavorable intersections between the spring end acting upon the valve ring and the ring are to be avoided. On the other hand, the springs can be distributed along the entire circumference of the cross-pieces running in the direction of the circumference, and the maximum diameter of the springs is narrowly limited. In particular, if conically milled catchers are used, which are considerably less expensive to produce than cylindrically milled catchers but also show more favorable through-flow properties, springs with a diameter that is much below the width of the ring must be selected. While this does not produce any noteworthy limitations for valves that have wide rings, for narrower rings only springs that are too filigree to ensure reliable operation may be used. However, the operation of fast running compressors and/or compressor levels that work under higher pressures requires the use of valves with relatively low lifts. To achieve sufficiently large cross sections for the flow even with low lifts, narrow rings must be selected. The demands that are placed upon the robustness of the springs are particularly high with these applications, which is why in practice this situation results in a dilemma that could not be resolved to date.

With the valve that has been referred to above and that is known in the art from, for example, EP 345 245 A1 or from AT-PS 391.928, there is the advantage that large and robust springs can be selected which are placed on the knots, consisting of the cross-pieces that extend in radial and circumferential directions, of the support plate. But in realizations that have more than two ring plates there is the disadvantage that the middle rings cannot at all or can only be guided insufficiently in the radial direction. In fact, realizations have become known in the art in which profiles were incorporated in that side of the synchronous plate that is directed toward the rings; however, in practical applications it was shown that the centering of the rings that results under certain conditions is not sufficient, which is why the rings undergo a lateral deviation due to the effect of the flow forces. This causes wear and tear or breakage of the rings leading to the failure of the valve.

Therefore, it is the subject-matter of the present invention to avoid the outlined disadvantages that embodiments known in the art suffer from and, in particular, to realize a valve of the type referred to at the outset in such a way that the guidance of the individual ring plates can be enhanced in the direction of lift without having to compromise in terms of the way that the ring plates are equipped with springs.

SUMMARY OF THE INVENTION

This objective is achieved with a valve of the kind referred to above which has a support plate consisting of individual, concentrically arranged support rings that overlap respectively two ring plates which are adjacent to each other. In the direction of lift the support rings are guided on guidance extensions of the catcher, which are arranged on the radial cross-pieces of the catcher, respectively of the area of the outer and inner circumferences of the support rings, and that protrude in the direction of the valve seat to such a measure that the respectively adjacent ring plate is also guided on it across the entire lift. Thus, the support plate that overlaps the ring plates is divided into individual, concentric support rings that overlap or load respectively one pair of ring plates. The guidance extensions located in the area of the radial cross-pieces of the catcher can be used for each individual support ring on the outer and/or inner circumference for the purpose of guiding in the direction of the lift. Normally, just one of these guidance options will suffice. The two individual ring plates that are overlapped or spring-equipped by a single support plate are guided, respectively, only on one side via the adjacent guidance extensions (i.e. either on the outer or on the inner circumference) within— an individual group the outer, larger ring plate is guided, respectively, on the outer circumference and the inner, smaller ring plate is guided on the inner circumference in the direction of lift on the guidance extensions of the catcher.

It is to be noted at this point that if the number of ring plates is uneven, for example, the use of the support ring can be foregone entirely for the inner ring (or any other individual ring), or, deviating from the described realization, a support ring can be selected that supports only a single ring plate in the corresponding position. Another corresponding possibility provides that the three inner rings are spring-equipped by way of a joint support ring; in particular, and in order to realize a radial guidance of the middle one of the rings the corresponding guidance extensions of the catcher protrude through a slot of the support ring. For the case referred to initially in the above the springs for the single ring plate can also be arranged, for example, on the circumferential cross-pieces of the catcher which, due to the usually small diameter of the innermost ring, will not lead to any decisive restrictions in terms of the maximum possible usable spring force.

With the described realization according to the invention the undesired radial play of individual ring plates is reliably limited via guidance surfaces on the guidance extensions of the catcher that work in conjunction with the ring plates for the length of the entire lift. Even though this is also possible with the individually spring-equipped ring plates described at the outset, as long as guidance cross-pieces can be connected to the catcher for each individual plate, it also entails the described disadvantages with respect to equipping the individual plates with springs.

A joint buffer plate that essentially overlaps respectively two ring-shaped seat plates is known in the art from, e.g., U.S. Pat. No. 1,735,205. In this case, however, the joint equipping with springs of the two seat plates is accomplished by way of single springs that catch in the slot between the plates, taking over the guidance of seat plate and buffer plate in the direction of lift at the same time, which is not practical for today's fast running piston compressors and involves a number of disadvantages.

A valve without a support plate that overlaps the individual ring plates and guides the ring plates, respectively in pairs, alternately on the guidance surfaces of the catcher that catch on the outer and inner circumference, is also known in the art. However, in view of the missing support plate, the prerequisites for equipping the ring plates with springs are completely different.

In accordance with a further preferred realization of the invention the springs for loading the support rings are arranged in the area of the knots between the radial and circumferential cross-pieces of the catcher. It is possible to envision single as well as several springs in this area whose concrete realization (for example coil springs, spring clips, etc.) is unimportant in the context of the invention. Only the space that is available in this area essentially restricts the size, number and shape of these springs so as to avoid having to narrow the cross sections of the flow-though unnecessarily.

With the embodied examples of the valve according to the invention that were described in the above it may not be possible in certain cases to achieve an even equipping with the springs, i.e., not all ring plates are acted upon with approximately the same spring tension in relation to the approach flow surface. In accordance with another realization of the invention it can be envisioned in this case that varying spring strengths are envisioned for the single support rings, preferably by arranging springs of different sizes or by arranging different numbers of springs per support ring and cross-piece knot.

When the valves according to the invention are used, for example in connection with high-pressure stages of compressors, it may become clear that the required high spring tension cannot be provided by the relatively few springs that are to be positioned on the cross-piece knots. To solve this problem, in another realization of the invention it is envisioned that the two ring plates allocated to a certain support ring including the circumferential cross-pieces of the support ring located above them have different widths, and the springs for loading the support ring catch on that side of the wider of the two circumferential cross-pieces of the support ring that points toward the catcher. In the alternative, and for reasons of maintaining advantageous, equal ring widths for all ring plates the advantageous use of another realization of the invention is possible as well. In this realization the free flow-through slots in the support rings are at least on one side sloped with a conical-type restriction in relation to the valve axis. And the springs for loading the support rings catch, consequently, on a side of the flow-through slots, which is directed toward the catcher, that is the wider side of the circumferential cross-pieces of the support ring. In both cases the springs can be distributed across the entire length of the wider circumferential cross-pieces. Also, this eliminates or renders much less important the limitation with regard to a maximum selectable spring diameter that was referred to at the outset. The passage slot can be adjusted to the allocated ring contour on the side of the support rings that is directed toward the ring plates, thereby avoiding any additional turbulence of the flow. Correspondingly, the passage slot can be adjusted on its exit side in the direction of the catcher with regard to the exit flow slot there as well in order to avoid any of corresponding difficulties involving edges that protrude into the flow.

In a further realization of the invention the springs on the catcher side are guided in spring nests, which simplifies the apparatus and makes it safer in terms of its operation.

To maximize the cross section of the flow-through at the position of the spring it is possible to provide bore holes in the support rings in a further realization of the invention; preferably, the bore holes are smaller than the inside diameter of the spring. A corresponding bore hole is envisioned in the same manner in the spring nest or on the catcher thus providing an additional cross section of flow-through.

It is envisioned in accordance with one particularly preferred realization of the invention that the support rings have nose projections on the inner and/or outer circumference, in particular in the area of the individual guidance extensions of the catcher, which stick out and act in conjunction with the guidance extensions. This way the undesired rotational movement of the ring plates in relation to the valve seat is easily avoided in many instances.

A partial, schematically depicted embodiment of the invention will be described in more detail using the accompanying drawings.

DETAILED DESCRIPTION OF THE PREFERRED EMBODIMENTS

Figure 1:
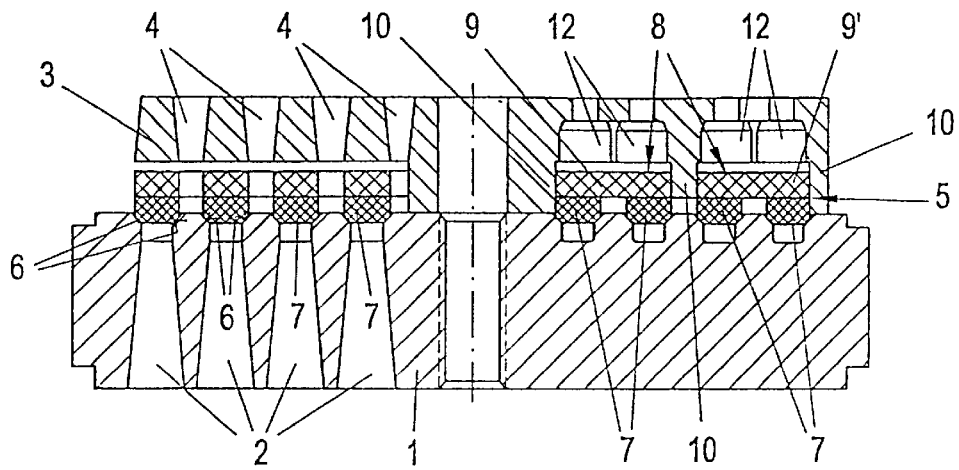
FIG. 1 shows a partial section of the valve according to the invention.
Figure 2:
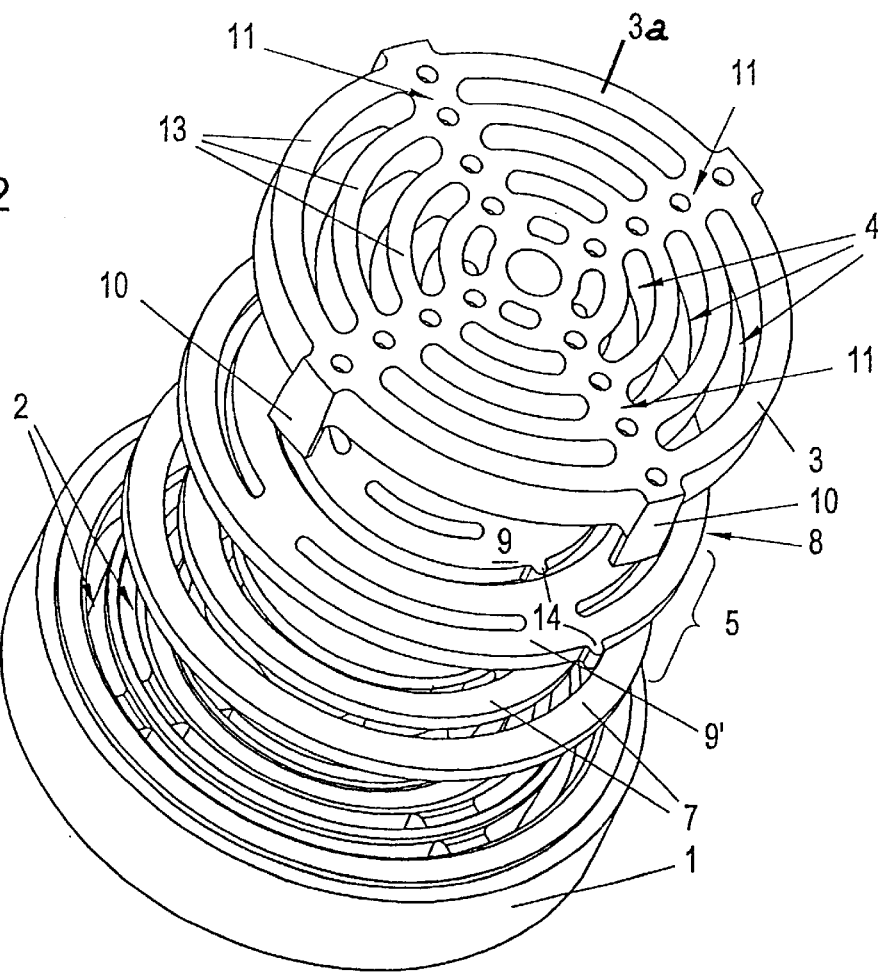
FIG. 2 depicts an exploded view of the valve according to FIG. 1.

The valve shown in FIGS. 1 to 4 can be used, for example, as an entry or as an exit valve in a piston compressor (not shown). In principle it consists of a valve seat 1 which is essentially comprised of ring-shaped, concentrically arranged passage channels 1 for the controlled medium; a catcher 3 which includes a base plate 3a that is further comprised of flow-off channels 4 arranged at a distance over the valve seat, and guide extensions 10; a valve plate 5 that is movably arranged, in particular it is movable back and forth between the catcher 3 and the valve seat 1, the valve plate including several ring plates 7, allocated to the passage channels 2 of the valve seat 1, with essentially sloped sealing surfaces 6, and a support plate 8 which is spring-loaded from the side of the catcher 3 and rests on the ring plates 7. The support plate 8 is formed of two concentrically arranged individual support rings 9, 9' overlapping respectively two adjacent ring plates 7, which are guided in the direction of lift on the guidance extensions 10 of the catcher 3. These guidance extensions 10 are arranged—as illustrated in particular in FIGS. 2 to 4—on the radial cross-pieces 11 of the base plate 3a of catcher 3, respectively in the area of the outer and inner circumference of the support rings 9, 9', and they protrude in the direction of the valve seat 1 to such an extent (in accordance with FIGS. 1 and 2 downward and according to the representation in FIGS. 3 and 4 upward) that the respectively adjacent ring plate 7 is guided to it across its entire lift.

The coil springs, not depicted here, for loading the support rings 9, 9' are arranged in the spring nests 12 in the area of the knots between the radial and circumferential cross-pieces 11, 13 of the catcher 3, and the spring tension is distributed to the individual ring plates 7 via the support rings 9, 9'.

Figure 3:
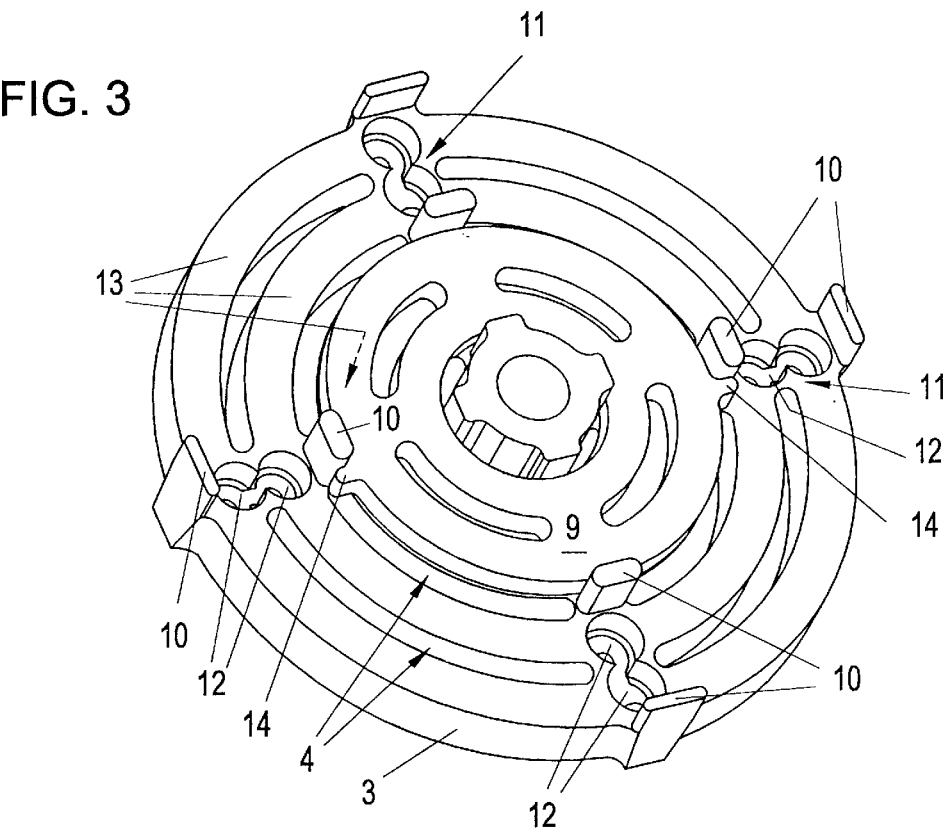
FIG. 3 shows a perspective, view of the catcher of the valve according to FIGS. 1 and 2, in particular from below with an inserted individual support ring.
Figure 4:
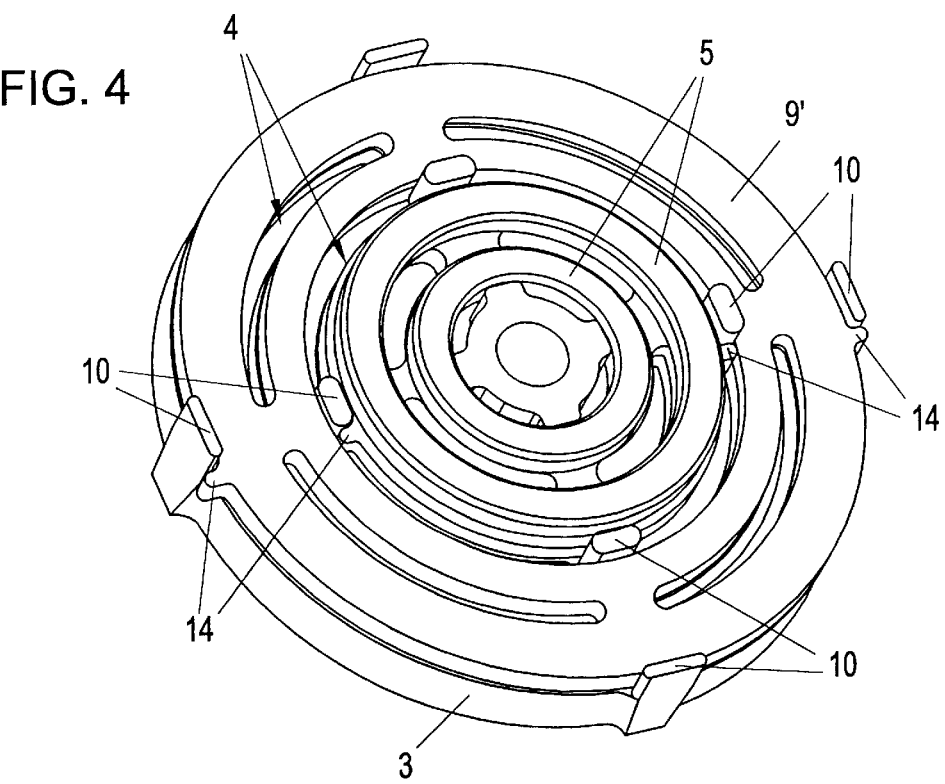
FIG. 4 displays the catcher in a depiction in accordance with FIG. 3, in particular with both support rings inserted and, additionally, two inserted single ring plates.

As illustrated in particular in FIG. 3, on their outer circumference in the area of two of the guidance extensions 10 of the catcher 3 the support rings (only the inner support ring is shown in FIG. 3 and designated with the symbol 9) have nose projections 14 that stick out and act in conjunction with the guidance extensions. This precludes any rotational movement of these support rings 9, 9' in relation to the valve seat 1. Due to the shown offset arrangement of the nose projections 14 along the circumference, any displacement of the support rings 9, 9' in both directions is reliably prevented without the need for any additional such nose projections 14.

Figure 5:
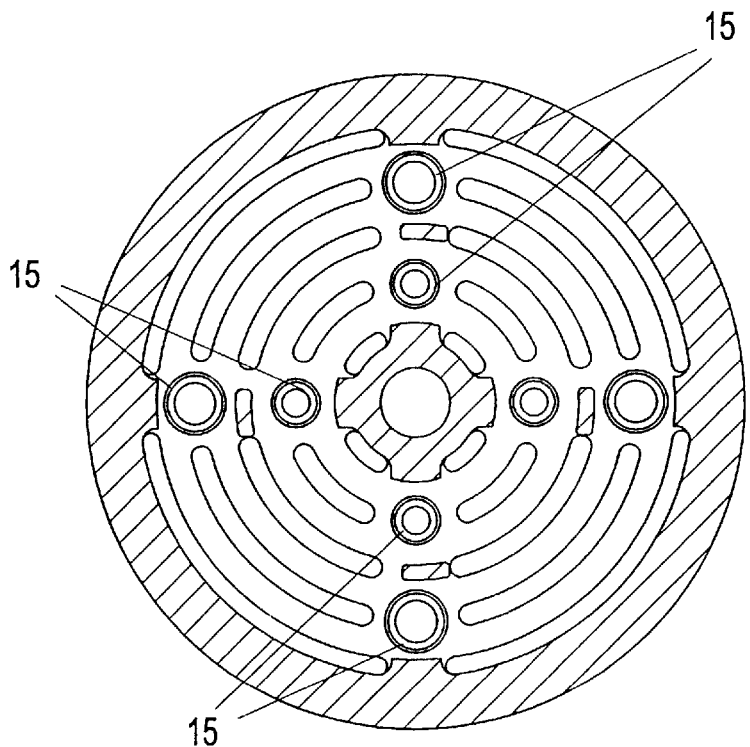
FIGS. 5 and 6 reflect partial sections of different embodied examples of other valves according to the invention (sectional view and sectional direction in accordance with the section line A—A in FIG. 8)
Figure 6:
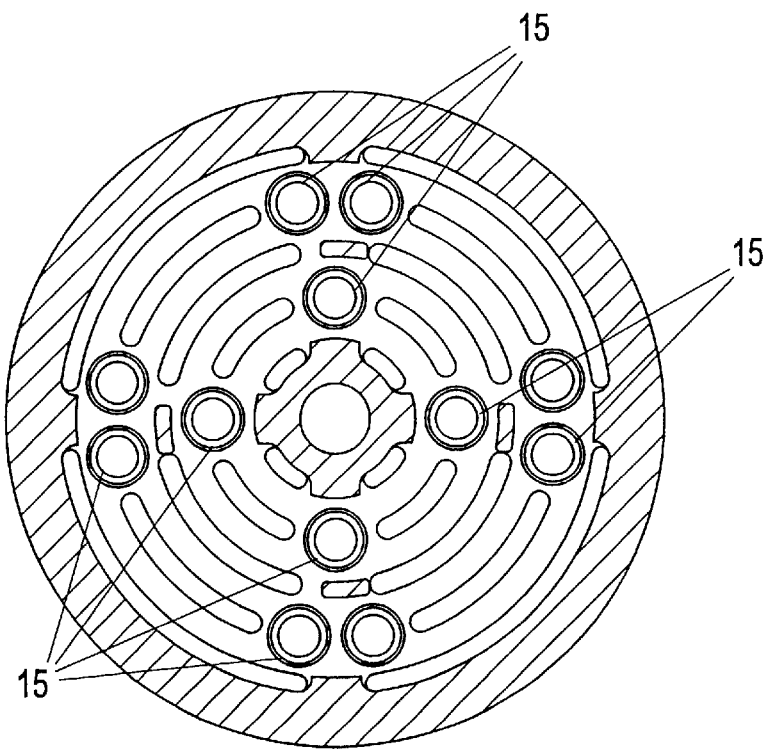

According to the representations in FIGS. 5 and 6, different spring strengths are envisioned for the individual support rings, not visible here due to the section cut. In the realization according to FIG. 5, springs 15 of different sizes are allocated to the individual support rings, wherein, in contrast, in the realization according to FIG. 6 the outer support ring is loaded with two and the inner support ring with only one spring 15 in the area of each cross-piece knot. An even spring supply, for example, of the ring plates can be accomplished in this manner so that approximately the same spring force is applied to all ring plates in relation to the approach flow surface.

Figure 10:
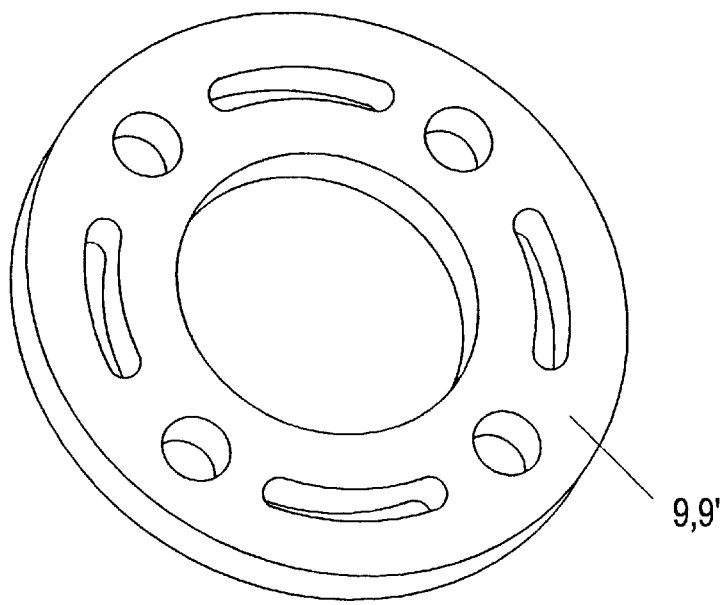
FIGS. 10 and 11 show support rings for use in, e.g., constructions such as those according to FIGS. 5 and 6.
Figure 11:
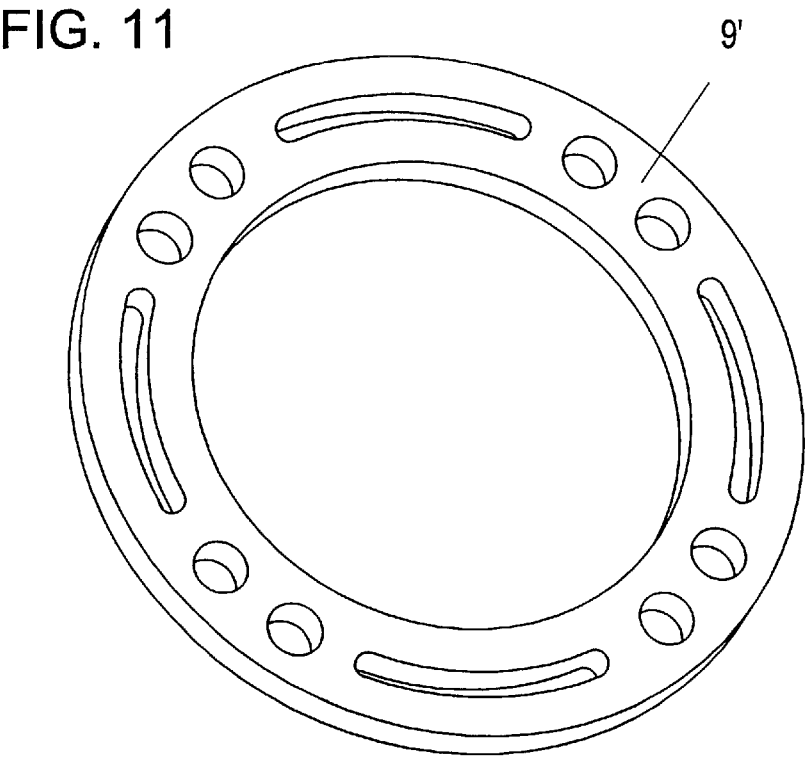

In addition, there is a possibility with this construction to increase the flow-through cross section by placing corresponding bore holes in the support rings at the position of the springs. Suitable support ring realizations are depicted in FIG. 10 (for an apparatus according to FIG. 5 outer and inner, and FIG. 6 inner) and FIG. 11 (for an apparatus according to FIG. 6 outer).

Figure 7:
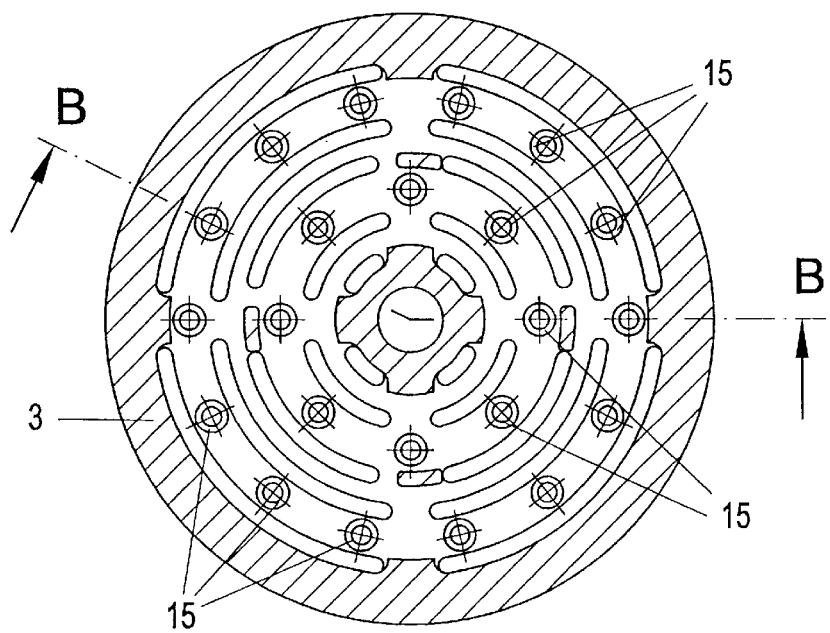
FIGS. 7 and 8 represent sections through another valve according to the invention (FIG. 7 along the line A—A in FIG. 8, and FIG. 8 along the line B—B in FIG. 7)
Figure 8:
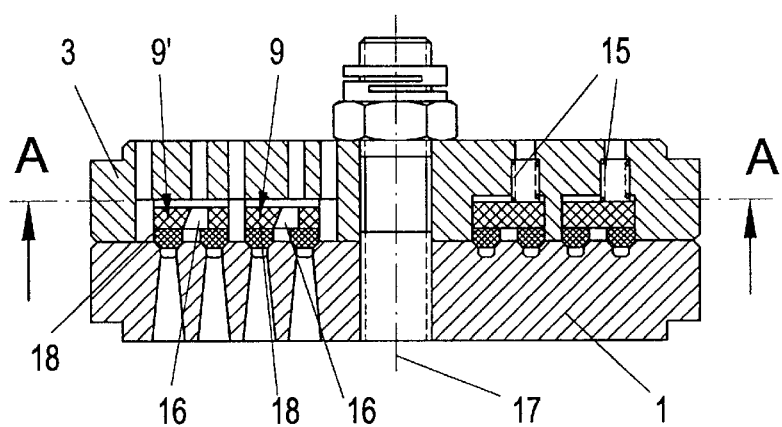
Figure 9:
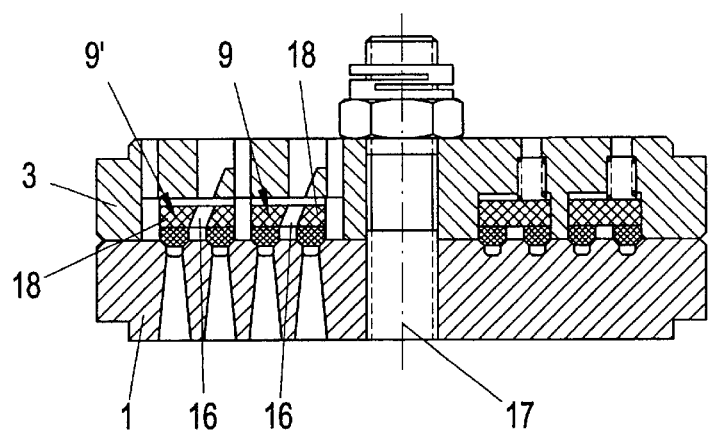
FIG. 9 is another embodiment of the invention, in particular a sectional view like in FIG. 8.

In the realizations according to the FIGS. 7 to 9 the free flow-through slots 16 in the support rings 9, 9' are, in relation to the valve axis 17, at least on one side conically sloped, and the springs 15 for loading the support rings 9, 9' catch on the side of the flow-through slots 16 that is, therefore, wider and the side of the circumferential cross-pieces 18 of the support rings 9, 9' directed toward the catcher 3. This way it is possible that springs 15 with a relatively large diameter acting upon the respectively wider, outer circumferential cross-piece 18 are applied, the narrower, inner circumferential cross-pieces of the support rings 9, 9' are only connected via the radial cross-pieces and therefore also supplied with springs.

Specifically from FIGS. 8 and 9 it can be seen that the flow-through slots 16 of the supply rings 9, 9' can be easily realized in such a manner that the medium flowing through from the side of the valve seat 1 is not unnecessarily redirected or obstructed by protruding edges. For a realization in accordance with FIG. 9 it must be noted that the flow-off channels in catcher 3 are also correspondingly sloped in order to avoid any unnecessary flow obstruction.

Aside from the realizations shown in FIGS. 8 and 9 the two ring plates 7, allocated to a certain support ring 9, 9', including the circumferential cross-pieces of the support ring itself that are located above the former can also have altogether different widths. The springs for loading the support ring could catch on the side of the wider of the two circumferential rings of the support ring that is directed toward the catcher. This way it is also ensured that correspondingly stronger dimensioned springs can catch on the respectively wider circumferential cross-piece, thereby also supplying spring action to the respectively other support ring or the corresponding ring plate.

In the displayed realizations of the valve the valve seat 1 and the catcher 3 consist, as usual, of metallic materials, preferably steel; the ring plates 7 and the support rings 9, 9' consist of correspondingly reinforced plastic materials; the material selection in this area is determined most importantly by the application purpose (operational temperature, operational pressure etc.)—if necessary, any other suitable materials can be used.

We claim:

1. A valve which comprises:
   a valve seat that includes essentially ring-shaped, concentrically arranged channels for passage of a controlled medium therethrough,
   a catcher spaced from said valve seat, said catcher including a base plate formed of radial cross portions and circumferential cross portions that define flow-off channels therethrough, and outer and inner guide extensions which extend from said radial cross portions of said base plate toward said valve seat, and
   a valve plate assembly which is movably located between said valve seat and said base plate of said catcher, said valve plate assembly including a plurality of concentric ring plates that each include sloped sealing surfaces for positioning in passage channels of said valve seat so as to block said passage channels, and a plurality of concentric support rings between said ring plates and said base plate of said catcher, each of said support rings being biased towards said valve seat and each support ring overlapping two ring plates, said support plates and said ring plates being respectively guided in lift and return movement between said valve seat and said base plate of said catcher by one of said inner and outer guide extensions.

2. A valve according to claim 1, including a plurality of springs between said catcher and said support rings to bias said support rings towards said valve seat.

3. A valve according to claim 2, where said springs are helical springs.

4. A valve according to claim 3, wherein said ends of said helical springs contact said catcher at knot areas between said radial and said circumferential cross portions.

5. A valve according to claim 4, wherein said catcher includes blind bores in which said ends of said helical springs extend.

6. A valve according to claim 4, wherein said support rings include circumferential portions that define circumferential slots therethrough, and wherein said circumferential portions have larger surfaces facing said catcher than opposite surfaces thereof facing said ring plates.

7. A valve according to claim 4, wherein said support rings include circumferential portions that define circumferential slots therethrough, wherein said circumferential slots have one said side which is conically sloped relative to a center line through said valve such that said circumferential portions have one surface facing said catcher of larger area than an opposite surface.

8. A valve according to claim 3, including helical springs of more than one diameter.

9. A valve according to claim 3, including outer and inner support rings, and wherein more springs are positioned between said catcher and said outer support ring than between said catcher and said inner support ring.

10. A valve according to claim 3, wherein said base plate of said catcher and said support rings include holes therethrough at contacting locations of said helical springs, said holes having smaller diameters than said helical springs.

11. A valve according to claim 1, wherein said support rings include radial nose projections which contact at least one of the inner and outer guide extensions of said catcher.

* * * * *